Patented Dec. 23, 1952

2,623,045

UNITED STATES PATENT OFFICE 2,623,045

N-(SUBSTITUTED-AMINOETHYL) 4-AMINO-BENZOIC ACID DIETHYLAMINOETHYL ESTERS

Albert Schlesinger, Nathan Weiner, and Samuel M. Gordon, Queens County, N. Y., assignors to Endo Products, Inc., Richmond Hill, N. Y., a corporation of New York No Drawing. Application December 8, 1949, Serial No. 131,904

6 Claims. (Cl. 260—247.2)

This invention relates, in its principal aspects, to novel compounds possessing spasmolytic, histaminolytic or sympathicolytic activity. In particular it is directed to novel derivatives of the diethylamino ethanol ester of 4-amino benzoic acid, and more especially to the N-substituted derivatives of the 4-amino group.

It will also be understood that this invention is directed not only to these novel secondary and tertiary amines, but also to the salts thereof.

As a matter of general formulation with respect to the primary phase of this invention, the novel compounds thereof are represented by the following formula in which the symbol Et represents the ethyl radical.

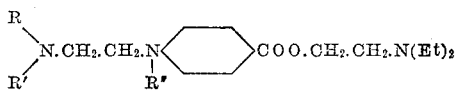

wherein the symbols R and R' designate alkyl, aryl alkyl and the terminal ends of a group which forms a heterocyclic structure with the nitrogen atom. Illustrative of such heterocyclic structures are the morpholino, and piperidino radicals. The symbol R" designates hydrogen, alkyl and aryl alkyl.

The following examples are members of the foregoing class of compounds and describe the methods of preparing the same.

*Example 1*

N-(β-diethylamino ethyl), N-(benzyl)-4-amino benzoic acid-β-diethylamino ethyl ester This compound has the formula:

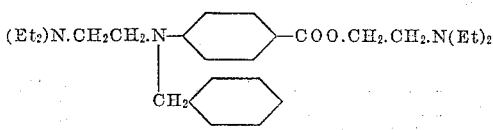

17.2 grams of β-diethyl amino ethyl chloride hydrochloride and 32.6 grams of N-benzyl-4-amino benzoic acid diethyl amino ethyl ester were mixed and heated in a closed vessel for 8 hours at 145°–150° C. After cooling, the reaction mixture was dissolved in hot, distilled water and the cooled solution then extracted with ether. The water solution was alkalized with 30% sodium hydroxide solution and the free base was extracted with ether. The ether extracted was then evaporated yielding an oil, the free base, in amount of 25 grams.

The free base, the product of this example, was transformed into the oxalate salt by the addition thereto of oxalic acid in ethanol. On recrystallization from methanol plus acetone, the oxalate was obtained in a yield of 30 grams. It had a melting point of 155° C.

Analysis calculated $C_{30}H_{43}O_{10}N_3$. Oxalic acid: 29.75%. Found: Oxalic acid 29.70%.

*Example 2*

N-(β-dimethylamino ethyl), N-(benzyl)-4-amino benzoic acid-β-diethylamino ethyl ester.

This compound has the formula:

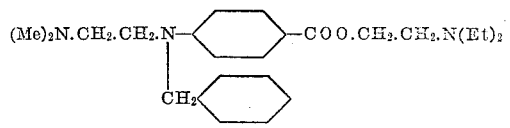

This new compound was prepared in accordance with the procedure described in Example 1 using similar amounts of reactants except that β-dimethyl amino ethyl chloride hydrochloride replaced the β-diethyl amino ethyl chloride hydrochloride of the foregoing example. The product of this example was obtained in a yield of 20%.

The oxalate salt of this new base was recrystallized from methanol and ethyl methyl ketone. It had a melting point of 138° C.

Analysis: Calculated $C_{28}H_{39}O_{10}N_3$. Oxalic acid: 31.19%. Found: Oxalic acid 31.42%.

*Example 3*

N-(β-piperidino ethyl), -4-amino benzoic acid-β-diethylamino ethyl ester

This compound has the formula:

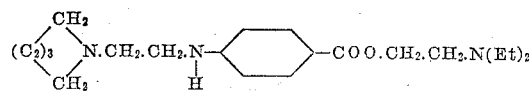

This new product was prepared in accordance with the general procedure described in Example 1 except that β-piperidino ethyl chloride hydrochloride was used in the place of the β-diethyl amino ethyl chloride hydrochloride of that example, and 4-amino benzoic acid-β-diethyl amino ethyl ester was used in the place of the N-benzyl- 4-amino benzoic acid β-diethyl amino ethyl ester of that example. The oxalate salt of this new base was obtained by recrystallization from methanol in a yield of 50%. This salt had a melting point of 110° C.

Analysis: Calculated for C24H37O10N3. Oxalic acid, 34.15%. Found: Oxalic acid 33.89%.

*Example 4*

N-(β-morpholino ethyl), N-(benzyl)-4-amino benzoic acid-β-diethylamino ethyl ester
This compound has the formula

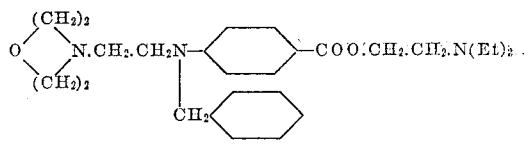

This new product was prepared in accordance with the general procedure described in Example 1 except that β-morpholino ethyl chloride hydrochloride was used in the place of the β-diethylamino ethyl chloride hydrochloride of that example.

The oxalic acid salt of this new product was obtained by recrystallization from methanol plus acetone in a yield of 55%. This salt had a meltpoint of 170° C.

Analysis: Calculated for C30H41O11N3. Oxalic acid, 29.08%. Found: Oxalic acid 29.35%.

*Example 5*

N-(β-diethyl amino ethyl)-4-amino benzoic acid-β-diethylamino ethyl ester
This compound has the formula:

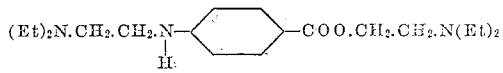

This new product was prepared in accordance with the general procedure described in Example 1 except that 4-amino-benzoic acid-β-diethylamino ethyl ester was used in the place of the N-benzyl-4-amino benzoic acid-β-diethylamino ethyl ester of that example.

The oxalic acid salt of this new base was obtained by recrystallization from acetone in a yield of 40%. This salt had a melting point of 142° C.

Analysis: Calculated for C23H37O10N3. Oxalic acid, 34.95%. Found: 34.41%.

*Example 6*

N-(β-dimethylamino ethyl)-4-amino benzoic acid-β-diethylamino ethyl ester
This compound has the formula:

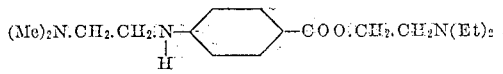

This new product was prepared in accordance with the general procedure described in Example 1 except that β-dimethyl amino ethyl chloride hydrochloride and 4-amino benzoic acid-β-diethylamino ethyl ester were used in the place of the -β-diethylamino ethyl chloride hydrochloride and the N-benzyl-4-amino benzoic acid-β-diethyl amino ethyl ester respectively which were used in that example.

The oxalic acid salt of this new base was obtained by recrystallization from methanol plus acetone in a yield of 56%. This salt had a melting point of 148° C.

Analysis: Calculated for C21H33O10N3. Oxalic acid, 36.96%. Found: Oxalic acid 36.81%.

*Example 7*

N-(β-piperidino ethyl), N-(benzyl)-4-amino benzoic acid-β-diethylamino ethyl ester
This compound has the formula:

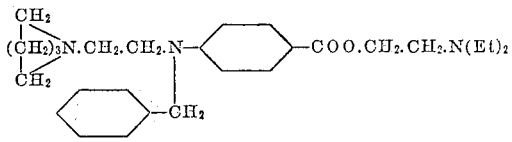

This new product was prepared in accordance with the general procedure described in Example 1 except that β-piperidino ethyl chloride hydrochloride was used in the place of the β-diethylamino ethyl chloride hydrochloride of that example.

The oxalic acid salt of this new base was obtained by recrystallization from methanol plus acetone in a yield of 50%. This salt had a melting point of 138° C.

Analysis: Calculated for C31H43O10N3: Oxalic acid, 29.17%. Found: Oxalic acid, 29.23%.

*Example 8*

N-(β-morpholino ethyl)-4-amino benzoic acid-β-diethylamino ethyl ester
This compound has the formula:

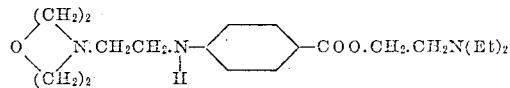

This new product was prepared in accordance with the general procedure described in Example 1 except that β-morpholino-ethyl chloride hydrochloride and 4-amino benzoic acid-β-diethylamino ethyl ester were used in the place of the β-diethylamino ethyl chloride hydrochloride and the N-benzyl-4-amino benzoic acid-β-diethylamino ethyl ester respectively which were used in that example.

The oxalic acid salt (monohydrate) of this new base was obtained by recrystallization from methanol in a yield of 45%. This salt had a melting point of 140° C.

Analysis: Calculated for C22H34O9N3.H2O: Oxalic acid, 26.10%. Found: Oxalic acid, 26.41%.

*Example 9*

N-(β-dibenzylamino ethyl), 4-amino benzoic acid-β-diethyl amino ethyl ester
This compound has the formula:

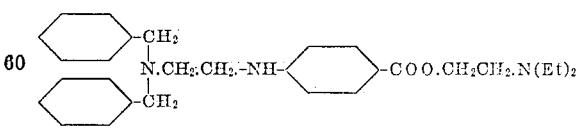

This new compound was prepared in accordance with the general procedure described in Example 1, except that the initial starting materials were β-dibenzyl amino ethyl chloride hydrochloride and 4-amino benzoic acid-β-diethylamino ethyl ester.

The di-hydrochloride salt of the new base was obtained in a yield of 40%. When recrystallized from ethanol and ether, the salt had a melting point of 70° C.

Analysis: Calculated for C29H39O2N3Cl2: Cl, 13.32%. Found: Cl, 13.55%.

Example 10

N-(β-dibenzylamino ethyl), N-(benzyl)-4-amino benzoic acid-β-diethylamino ethyl ester This compound has the formula:

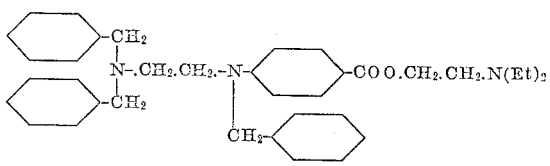

This new compound was prepared in accordance with the general procedure described in Example 1, except that the initial starting materials used were β-dibenzylamino ethyl chloride hydrochloride and N-benzyl-4-amino benzoic acid-β-diethyl amino ethyl ester.

The dihydrochloride salt of this new base was obtained in a yield of 70%. On recrystallization from ethanol and ether, this salt had a melting point of 71° C.

Analysis: calculated for $C_{36}H_{45}O_2N_3Cl_2$: Cl, 11.39%. Found: 11.87%.

I claim:

1. Basic nitrogen compounds and their acid addition salts wherein the free base forms have the formula

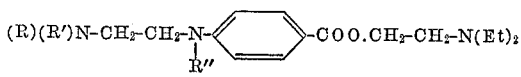

wherein: R and R' are members of the group consisting lower alkyl, monocyclic aryl alkyl, and the terminal ends of group that forms with the nitrogen atom a ring of the group consisting of morpholino and piperidino, and R'' is a member of the group consisting of hydrogen and monocyclic-aryl alkyl.

2. N-(β-morpholino ethyl), N-(benzyl)-4-amino benzoic acid-β-diethylamino ethyl ester.

3. N-(β-dimethylamino ethyl)-4-amino benzoic acid-β-diethyl-amino ethyl ester.

4. N-(β-diethyl amino ethyl)-4-amino benzoic acid-β-diethyl-amino ethyl ester.

5. N-(β-morpholino ethyl)-4-amino benzoic acid-β-diethylamino ethyl ester.

6. N-(β-dibenzylamino ethyl), N-(benzyl)-4-amino benzoic acid-β-diethylamino ethyl ester.

ALBERT SCHLESINGER.
NATHAN WEINER.
SAMUEL M. GORDON.

REFERENCES CITED

The following references are of record in the file of this patent:

UNITED STATES PATENTS

| Number | Name | Date |
|---|---|---|
| 1,334,642 | Altwegg et al. | Mar. 23, 1920 |
| 1,889,645 | Eisleb | Nov. 29, 1932 |
| 2,073,099 | Eisleb | Mar. 9, 1937 |
| 2,406,627 | Parker et al. | Aug. 27, 1946 |
| 2,456,556 | Cope | Dec. 14, 1948 |

OTHER REFERENCES

Rohrmann et al.: Chem. Abstr., vol. 30, (1936), pp. 4060–4061.

Beilstein Handbuch der Org. Chemie., vol. XIV, p. 424.

Fulmer et al.: J. Am. Chem. Soc., vol. 71, pp. 1209–1210 (1949).